(12) United States Patent
Kato et al.

(10) Patent No.: US 9,429,216 B2
(45) Date of Patent: Aug. 30, 2016

(54) CHAIN GUIDE AND CHAIN TENSIONER DEVICE

(75) Inventors: Akio Kato, Iwata (JP); Takahiro Yamashita, Iwata (JP); Katsufumi Abe, Iwata (JP)

(73) Assignee: NTN CORPORATION, Osaka (JP)

( * ) Notice: Subject to any disclaimer, the term of this patent is extended or adjusted under 35 U.S.C. 154(b) by 20 days.

(21) Appl. No.: 14/000,735

(22) PCT Filed: Feb. 15, 2012

(86) PCT No.: PCT/JP2012/053555
§ 371 (c)(1),
(2), (4) Date: Aug. 21, 2013

(87) PCT Pub. No.: WO2012/114959
PCT Pub. Date: Aug. 30, 2012

(65) Prior Publication Data
US 2013/0331211 A1    Dec. 12, 2013

(30) Foreign Application Priority Data

| Feb. 23, 2011 | (JP) | 2011-037504 |
| Feb. 23, 2011 | (JP) | 2011-037508 |
| Feb. 23, 2011 | (JP) | 2011-037511 |
| Feb. 25, 2011 | (JP) | 2011-039505 |
| Feb. 25, 2011 | (JP) | 2011-039507 |
| Jun. 13, 2011 | (JP) | 2011-131213 |
| Jun. 13, 2011 | (JP) | 2011-131214 |
| Feb. 15, 2012 | (JP) | 2012-030418 |

(51) Int. Cl.
*F16H 7/12* (2006.01)
*F16H 7/18* (2006.01)
*F16H 7/08* (2006.01)

(52) U.S. Cl.
CPC *F16H 7/12* (2013.01); *F16H 7/18* (2013.01); *F16H 2007/0865* (2013.01); *F16H 2007/0872* (2013.01); *F16H 2007/0891* (2013.01)

(58) Field of Classification Search
CPC ............ F16H 2007/0874; F16H 7/1254; F16H 2007/0872; F16H 7/18; F16H 2007/0891
USPC .............. 474/111, 140, 135, 137, 134
See application file for complete search history.

(56) References Cited

U.S. PATENT DOCUMENTS

| 68,625 | A | * | 9/1867 | Hawley | 474/137 |
| 993,684 | A | * | 5/1911 | Vom Hoff | 474/131 |

(Continued)

FOREIGN PATENT DOCUMENTS

| CN | 1419063 | 5/2003 |
| CN | 101055016 | 10/2007 |

(Continued)

OTHER PUBLICATIONS

International Preliminary Report on Patentability and Written Opinion of the International Searching Authority issued Sep. 6, 2013 in International (PCT) Application No. PCT/JP2012/053555.

(Continued)

*Primary Examiner* — Henry Liu
(74) *Attorney, Agent, or Firm* — Wenderoth, Lind & Ponack, L.L.P.

(57) ABSTRACT

A chain guide and a chain tensioner device using the chain guide. A roller, brought into contact with a chain, comprises a support shaft supported by an opposing guide base provided along the running direction of the chain, and roller bearings each having a steel outer ring on the outer peripheral surface of the support shaft so as to be brought into contact with the chain. The roller is also configured to be assembled by inserting opposite ends of the support shaft into support recesses on facing wall surfaces of the guide base. The roller has a vibration damping material between the support shaft and the support recess of each of the plate members.

21 Claims, 11 Drawing Sheets

(56) References Cited

U.S. PATENT DOCUMENTS

| | | | | |
|---|---|---|---|---|
| 1,338,293 | A | * | 4/1920 | Fuchs ........................ 474/134 |
| 1,480,078 | A | * | 1/1924 | Kegresse ................... 180/9.62 |
| 1,499,920 | A | * | 7/1924 | Godden ......................... 193/37 |
| 1,579,245 | A | * | 4/1926 | Pennington .................. 305/134 |
| 2,341,273 | A | * | 2/1944 | Helberg ................... 74/501.5 R |
| 2,827,153 | A | * | 3/1958 | Olk et al. ..................... 198/790 |
| 2,892,206 | A | * | 6/1959 | Deibel ....................... 15/250.25 |
| 2,964,155 | A | * | 12/1960 | Flowers et al. ............ 193/35 R |
| 3,586,142 | A | * | 6/1971 | Inwood et al. ............ 193/35 R |
| 3,598,194 | A | * | 8/1971 | Wappler et al. ............. 180/6.2 |
| 3,888,217 | A | * | 6/1975 | Hisserich ................. 123/90.31 |
| 3,930,323 | A | * | 1/1976 | Marold et al. ................. 37/423 |
| 4,068,535 | A | * | 1/1978 | Sheets ......................... 474/132 |
| 4,078,642 | A | * | 3/1978 | Payne ........................... 193/37 |
| 4,213,523 | A | * | 7/1980 | Frost et al. ..................... 193/37 |
| 4,416,647 | A | * | 11/1983 | White, Jr. ..................... 474/134 |
| 4,416,648 | A | * | 11/1983 | Radocaj ....................... 474/135 |
| 4,723,516 | A | * | 2/1988 | Slagley et al. ............ 123/90.16 |
| 4,892,508 | A | * | 1/1990 | Ryan et al. ................... 474/101 |
| 4,908,006 | A | * | 3/1990 | Burysek et al. ............. 474/117 |
| 4,969,548 | A | * | 11/1990 | Kornylak .................. 193/35 R |
| 4,981,116 | A | * | 1/1991 | Trinquard ................ 123/90.31 |
| 5,244,439 | A | * | 9/1993 | Rogus ........................... 474/134 |
| 5,441,354 | A | * | 8/1995 | Broder et al. ............. 400/636.3 |
| 5,441,458 | A | * | 8/1995 | Rogus ........................... 474/189 |
| 6,041,490 | A | * | 3/2000 | Tabuchi et al. ................ 29/607 |
| 6,056,442 | A | | 5/2000 | Ono et al. |
| 6,062,998 | A | * | 5/2000 | Kumakura et al. .......... 474/111 |
| 6,179,740 | B1 | * | 1/2001 | Walker ........................ 474/134 |
| 6,189,639 | B1 | * | 2/2001 | Fuse et al. .................... 180/231 |
| 6,196,375 | B1 | * | 3/2001 | Cozza ....................... 198/836.1 |
| 6,220,211 | B1 | * | 4/2001 | Line ........................... 123/90.15 |
| 6,346,057 | B1 | * | 2/2002 | Edelmann .................... 474/135 |
| 7,104,909 | B2 | * | 9/2006 | Asbeck et al. ............... 474/135 |
| 7,419,447 | B2 | * | 9/2008 | Serkh ........................... 474/136 |
| 7,866,292 | B2 | * | 1/2011 | LaBere et al. ............ 123/90.31 |
| 7,909,717 | B2 | * | 3/2011 | Boussaguet et al. ........ 474/136 |
| 2003/0092521 | A1 | * | 5/2003 | Konno .......................... 474/111 |
| 2003/0181273 | A1 | | 9/2003 | Nakagawa et al. |
| 2004/0002401 | A1 | * | 1/2004 | Iverson ........................ 474/134 |
| 2006/0266493 | A1 | | 11/2006 | Yoshida et al. |
| 2007/0026986 | A1 | * | 2/2007 | Walker ......................... 474/134 |
| 2008/0070731 | A1 | * | 3/2008 | Vrsek et al. .................. 474/134 |
| 2009/0143177 | A1 | | 6/2009 | Nakano et al. |
| 2011/0294612 | A1 | * | 12/2011 | Kato ............................... 474/91 |
| 2012/0118434 | A1 | * | 5/2012 | Konishi ................. C21D 1/06 148/218 |
| 2013/0324339 | A1 | * | 12/2013 | Kato et al. .................... 474/137 |
| 2013/0331211 | A1 | * | 12/2013 | Kato et al. .................... 474/101 |

FOREIGN PATENT DOCUMENTS

| | | |
|---|---|---|
| CN | 101446213 | 6/2009 |
| JP | 2-296046 | 12/1990 |
| JP | 4-3150 | 1/1992 |
| JP | 4-262154 | 9/1992 |
| JP | 9-236157 | 9/1997 |
| JP | 9-273613 | 10/1997 |
| JP | 11-13426 | 1/1999 |
| JP | 11-20770 | 1/1999 |
| JP | 2001-187948 | 7/2001 |
| JP | 2001-227605 | 8/2001 |
| JP | 2003-269555 | 9/2003 |
| JP | 2006-242377 | 9/2006 |
| JP | 2006-329251 | 12/2006 |
| JP | 2007-270628 | 10/2007 |
| JP | 2009-228673 | 10/2009 |
| JP | 2010-180900 | 8/2010 |
| JP | 2011-32514 | 2/2011 |
| WO | 2010/090139 | 8/2010 |

OTHER PUBLICATIONS

International Search Report issued Apr. 17, 2012 in International (PCT) Application No. PCT/JP2012/053555.

Japanese Notification of Reason(s) for Refusal issued May 7, 2014 in corresponding Japanese Application No. 2011-039507.

International Preliminary Report on Patentability and Written Opinion of the International Searching Authority issued Sep. 6, 2013 in International (PCT) Application No. PCT/JP2012/054208.

International Search Report issued Apr. 3, 2012 in International (PCT) Application No. PCT/JP2012/054208.

Notification of First Office Action issued Apr. 20, 2015 in corresponding Chinese Application No. 201280009965.6 (with partial English translation).

Notification of First Office Action issued May 5, 2015 in corresponding Chinese Application No. 201280009952.9 (with English translation).

Extended European Search Report issued Jul. 3, 2015 in corresponding European Application No. 12749279.1.

Notice of Reasons for Rejection issued Aug. 4, 2015 in corresponding Japanese Application No. 2012-035736 (with English translation).

Decision of Rejection issued Sep. 29, 2015 in corresponding Japanese Application No. 2011-131213 (with English translation).

Notice of Reasons for Rejection issued Oct. 20, 2015 in corresponding Japanese Application No. 2011-039507 (with English translation).

Notice of Reasons for Rejection issued Nov. 4, 2015 in corresponding Japanese Application No. 2012-035736 (with English translation).

\* cited by examiner

CHAIN GUIDE AND CHAIN TENSIONER DEVICE

BACKGROUND OF INVENTION

1. Technical Field

The present invention relates to a chain guide which presses an endlessly connected chain and thereby gives tension to the chain so as to prevent the slacking of the chain, and also relates to a chain tensioner device.

2 Background Art

A chain tensioner device is provided with chain guides which are brought into contact with middle portions of a chain endlessly provided around drive and driven sprockets and running at high speed, and is configured to press at least one of the chain guides against the chain in the direction substantially perpendicular to the running direction of the chain to thereby apply tension to the chain so as to prevent the chain from slacking. The chain tensioner device is used for a timing chain, or the like, of a valve driving device of an engine.

The chain guide is configured to guide the chain while being in contact with the chain, and hence sliding resistance is generated due to friction between the chain guide and the chain, causing a problem of an increased noise and mechanical loss.

Known techniques for suppressing the noise and mechanical loss of the chain guide include those described in Patent Literature 1 and Patent Literature 2. The chain guides described in Patent Literature 1 and Patent Literature 2 are formed in a curved shape along the running direction of the chain, in which rollers are arranged at a sliding-surface portion which is brought into contact with the chain, and the rollers are rolled by being pressed against the chain running at high speed, and thereby the sliding resistance is reduced.

CITATION LIST

Patent Literature

Patent Literature 1: Japanese Patent Publication No. 9-236157
Patent Literature 2: Japanese Patent Publication No. 2010-180900

Technical Problem

Meanwhile, the chain guides described in the above literatures are assembled by inserting the support shaft of each of the rollers from the side of a side wall member constituting the chain guide, and hence has a problem of low efficiency of the assembly work.

Further, the problem of low efficiency of the assembly work is also posed unless the rollers are easily incorporated into a guide base for supporting the rollers.

Further, since the chain is brought into contact with the roller with strong frictional force, it is not only necessary to improve the mechanical strength of the roller which is brought into contact with the chain, but also necessary to reduce the sliding resistance between the chain and the roller. Since the timing chain is made of iron, the wear of the roller which is brought into contact with the chain may pose a problem, and hence high rigidity is required especially for the roller.

Further, in the chain guides described in the above literatures, in order to give tension to the chain, strong pressing force is applied to the guide base which supports the rollers.

Therefore, it is necessary to improve the mechanical strength of the guide base. Especially, when the guide base is made of resin, the mechanical strength of the guide base may pose a problem.

In the chain guides described in the above literatures, since the chain runs at high speed, the chain may flutter and thereby come off from the chain guide while running.

For this reason, a method is also conceivable in which the coming-off of the chain is prevented by providing a step on the outer peripheral surface of the roller that is brought into contact with the chain. However, when the step is provided on the outer peripheral surface of the roller, there arises a problem of increasing processing costs of the roller.

Further, an object of the present invention is to effectively prevent the coming-off of the chain without providing the step on the outer peripheral surface of the roller.

Further, since the chain is brought into contact with the roller with strong frictional force in the chain guide, it is not only necessary to improve the mechanical strength of the roller which is brought into contact with the chain, but also necessary to reduce the sliding resistance between the chain and the roller.

Further, since the chain moves at high speed on the chain guide while vibrating, the vibration is transmitted to the engine via the chain guide, and hence the sound level of the vibration becomes high, causing a problem of noise.

In order to withstand such vibration, the chain guide needs to have high mechanical strength, and hence the size of the chain guide increases. This results in a problem of an increased weight of the chain guide.

Further, as means for suppressing the vibration of the chain, a chain tensioner is generally attached. However, the vibration frequency of a timing chain is high, and hence there is also a problem of the vibration that cannot be sufficiently absorbed.

SUMMARY OF INVENTION

Accordingly, in order to solve the above-described problems, an object of the present invention is to provide a chain guide which has good assembly work efficiency and also has high mechanical strength and small sliding resistance of the chain contact surface, and which, even when being brought into contact with the chain running at high speed, is difficult to wear and has low noise and low vibration, and is also to provide a chain tensioner device using the chain guide.

Solution to Problem

In order to solve the above-described problems, the present invention provides a chain guide comprising a plurality of rollers which are brought into contact with an endlessly connected chain, and a guide base which is provided along the running direction of the chain and which supports opposite ends of a support shaft of each of the plurality of rollers, wherein the roller includes a roller bearing provided on the outer peripheral surface of the support shaft, the roller bearing having a steel outer ring which is brought into contact with the chain.

Further, the chain guide is characterized in that the guide base includes mutually facing side plate members respectively provided along opposite sides of the chain, and pillar members connecting the side plate members to each other, in that support recesses which respectively support opposite ends of the support shaft are respectively provided on the mutually facing wall surfaces of the side plate members, in that the support recess comprises an insertion recess having an opening in the chain-side end surface of the side plate member, and a fixing recess connected to the insertion recess and having a circular arc shape into which the end portion of the support shaft is fitted, in that each of opposite ends of the support shaft of the roller is inserted from the insertion recess into the fixing recess, so as to be supported by each of the side plate members, and in that the pillar members connecting the side plate members to each other are formed to be aligned in parallel with the insertion direction of the support shaft into the support recess.

A bottom member connecting the mutually facing side plate members to each other may be formed on the surface of the guide base, which surface is opposite to the chain running surface of the guide base.

It is preferred that the height of each of the side plate members of the guide base is higher than the level of the outer diameter surface of the roller supported by the side plate member.

When the height of each of the side plate members is set lower than the position of a connection pin of the chain running while being in contact with the rollers, the connection pin of the chain is not brought into contact with the side plate members, and hence the wear of the side plate members can be prevented.

The circular arc-shaped fixing recess is formed to have a diameter smaller than the diameter of the support shaft, and the support shaft is press-fitted into the fixing recess, so as to suppress the rotation of the support shaft.

An insertion port, which is provided at a position where the insertion recess is connected to the fixing recess, is formed to have a width smaller than the diameter of the circular arc-shaped fixing recess, so that the coming-off of the support shaft is prevented.

Note that in the present invention, a concept is used in which the roller bearing includes the needle roller bearing and the cylindrical roller bearing.

The roller comprises the support shaft supported by the side plate members, and a roller bearing provided on the outer peripheral surface of the support shaft, and is configured such that the outer ring of the roller bearing is brought into contact with the chain. Further, the roller may also be configured such that the outer periphery of the outer ring is covered with an iron outer annulus which is brought into contact with the chain.

As the roller bearing, it is possible to use a roller bearing comprising a steel outer ring having inward-extending flange sections at opposite ends thereof, and rollers provided with a retainer and incorporated in the outer ring.

The circular arc-shaped fixing recess is formed to have a diameter smaller than the diameter of the support shaft, and the support shaft is press-fitted into the fixing recess, so that the rotation of the support shaft is suppressed.

The insertion port, which is provided at a position where the insertion recess is connected to the fixing recess, is formed to have a width smaller than the diameter of the circular arc-shaped fixing recess, so that the coming-off of the support shaft is prevented.

The rollers supported by the guide base may be arranged at non-uniform intervals along the running direction of the chain.

The rollers supported by the guide base may be arranged on a single circle, or may be arranged on the circumference of two or more circles in contact with each other.

The guide base may be formed by integral molding using fiber-reinforced polyamide (PA) 66 or may be formed of a light metal.

Oil holes respectively penetrating the wall surfaces of the side plate members and the support shaft can be respectively provided in the side plate members and the support shaft, and a discharge hole for supplying lubricating oil to the roller bearing can be provided in the support shaft.

It is preferred that the discharge hole provided in the support shaft is located at a position opposite to the side brought into contact with the chain. When the position of the discharge hole of the oil hole is set in this way, oil can be smoothly supplied to the inside of the bearing.

As the roller bearing, it is possible to use a roller bearing comprising a steel outer ring having inward-extending flange sections at opposite ends thereof, and rollers provided with a retainer and incorporated in the outer ring.

The steel outer ring is formed by press-forming but may also be formed by cut-forming.

As for the hardness of the outer ring, it is preferred that an outer ring having hardness higher than the hardness of the chain is used so as to make it difficult for the outer ring to wear even when the outer ring is brought into contact with the chain running at high speed.

As the material of the steel outer ring or the iron outer annulus, it is preferred to use a material, such as SUJ2 and SCM, which can be subjected to hardening treatment.

It is preferred that the steel outer ring or the iron outer annulus has a thickness of 1 mm or more in order to prevent the deformation thereof and to improve the mechanical strength thereof.

It is desirable that the outer ring has a generating line shape of a barrel shape or a straight shape in order to avoid local high surface pressure due to point contact with the chain.

It is preferred that minute depressions and projections are formed on the surface of the steel outer ring or the iron outer annulus, in order to improve the retaining performance of lubricating oil.

It is desirable that the outer ring of the roller bearing constituting the roller is provided at a position lower than the end surface of the side plate member so that the timing chain is guided between the mutually facing wall surfaces of the side plate members, and thereby the coming-off of the timing chain is prevented.

It is preferred that minute depressions and projections are formed on the surface of the outer ring, in order to improve the retaining performance of lubricating oil.

Further, the surface of the outer ring may be subjected to nitriding treatment, so that the mechanical strength of the outer ring is improved.

It is desirable that the roundness of the outer ring is 20 μm or less, in order to reduce vibration and to achieve silence.

It is desirable that a vibration damping material is accommodated between the support shaft of the roller and the support recess of the side plate member supporting each of opposite ends of the support shaft.

The vibration damping material can be provided by being fitted to the outer periphery of each of opposite ends of the support shaft.

A step, to which the vibration damping material is fitted, may be provided on the outer periphery of each of opposite ends of the support shaft.

The vibration damping material is not provided on the outer periphery of the support shaft but may be provided on the inner periphery of the support recess of the side plate member.

The vibration damping material does not need to be provided on the entire circumference of the outer periphery of the support shaft, and may be provided only in the region corresponding to the load direction.

It is preferred that the vibration damping material is bonded to at least one of the outer periphery of the support shaft or the inner periphery of the support recess.

As a material of the vibration damping material, it is possible to use hydrogenated nitrile rubber (HNBR) and fluororubber. Further, vulcanization bonding is preferred when the vibration damping material is bonded to the outer periphery of the support shaft or the support recess.

Further, it is preferred that, in the vibration damping material, the rigidity in the shaft direction is larger than the rigidity in the radial direction.

A chain tensioner device is configured such that at least two of the chain guides according to the present invention are respectively arranged at middle portions of an endlessly connected chain, such that, in one of the chain guides, one end side is supported by a rotary shaft and the other end side is pressed by a pressing device so as to be rocked to give tension to the chain, and such that opposite ends of the other of the chain guides are fixed so that the chain guide is pressed against the chain. With this configuration, it is possible to obtain an excellent chain tensioner device having a small mechanical loss.

Advantageous Effects of Invention

With the chain guide according to the present invention, the roller can be supported between the mutually facing wall surfaces of the side plate members constituting the guide base only by dropping the support shaft of the roller into the support recess provided in each of the mutually facing wall surfaces of the side plate members so as to be fitted therein, and hence the assembly work efficiency is improved.

Further, the guide base includes the mutually facing side plate members respectively provided along opposite sides of the chain, and the pillar members connecting the side plate members to each other, and is configured such that the direction of the pillar members connecting the side plate members to each other is formed to be aligned in parallel with the insertion direction of the support shaft into the support recess. Therefore, the pillar members provided between the support recesses can be formed thickly, and hence the mechanical strength of the guide base can be increased.

That is, when the direction of the pillar members is not in parallel with the insertion direction of the support shaft into the support recess, the pillar member cannot be arranged between the support recesses unless the thickness of the pillar member is reduced.

Further, when the direction of the pillar members connecting the side plate members to each other is formed to be aligned in parallel with the insertion direction of the support shaft into the support recess, the drawing directions of the mold for forming the pillar members and the support recesses can be set to the same direction, and hence the mold can be manufactured at low cost.

Further, when the height of the side plate member is set lower than the position of the connection pin of the chain which runs while being in contact with the rollers, the connection pin of the chain is not brought into contact with the side plate member, so that the wear of the side plate member can be prevented.

Further, the portion of the roller which is brought into contact with the chain is the steel outer ring of the roller bearing. Therefore, the portion has high mechanical strength and low sliding resistance, and is difficult to wear even when being brought into contact with the chain running at high speed. Further, the chain guide is configured such that the steel outer ring of the roller bearing is brought into direct contact with the chain. Thereby, the number of components can be reduced, and the cost and weight of the chain guide can be reduced.

Further, the vibration damping material is accommodated between the support shaft of the roller, and the support recess of each of the side plate members respectively supporting opposite ends of the support shaft. Thereby, vibration of the roller can be absorbed by the vibration damping material, and hence the vibration is difficult to be transmitted to the side plate members of the chain guide, so that vibration and noise are suppressed to be low.

DESCRIPTION OF EMBODIMENTS

Figure 1:
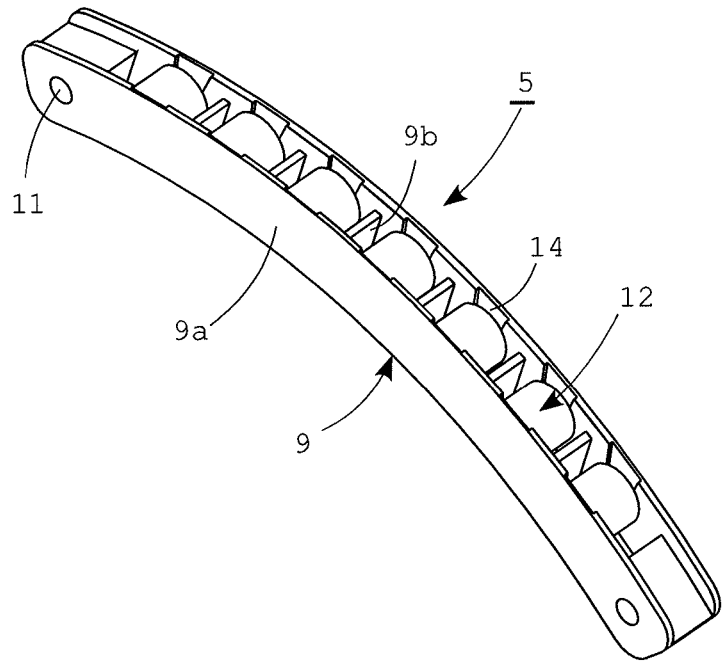
FIG. 1 is a perspective view showing an embodiment of a chain guide according to the present invention.

Embodiments according to the present invention will be described in detail with reference to the accompanying drawings. Note that components, which are the same or equivalent to each other, are denoted by the same reference numeral or character in the drawings, and the description thereof is not repeated to avoid duplication of description.

A chain guide according to an embodiment of the present invention is used, for example, for giving tension to a timing chain of an engine valve drive system.

Figure 19:
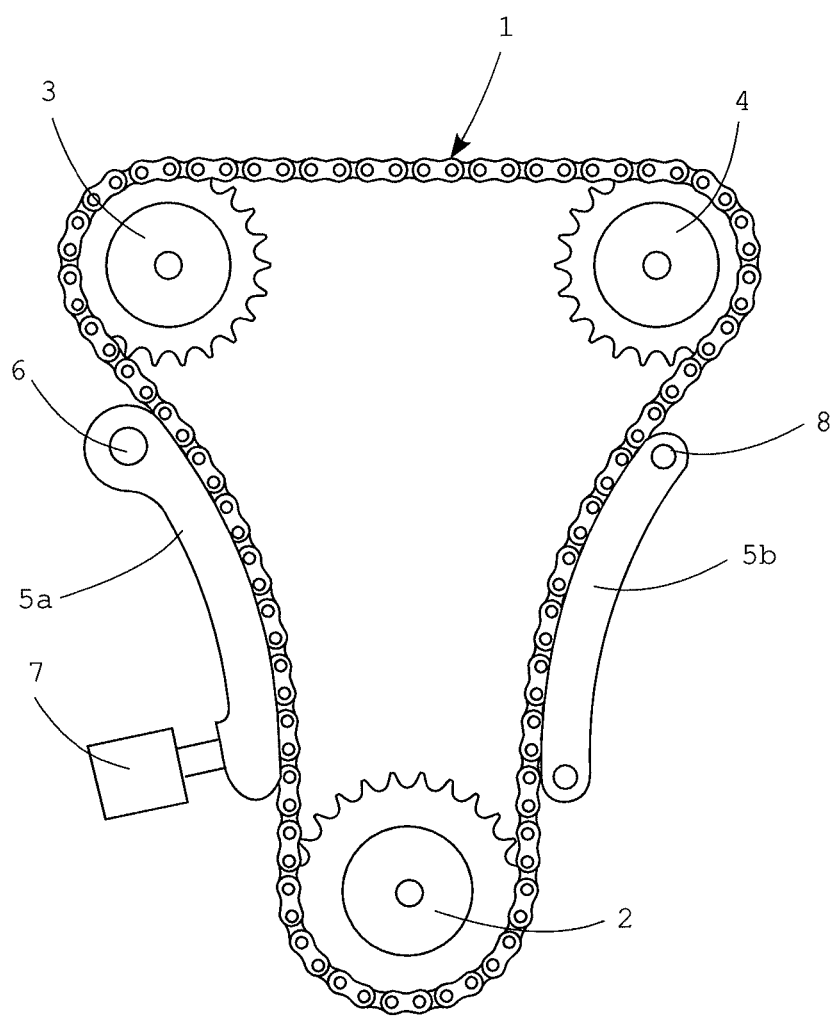
FIG. 19 is a front view showing an example of a chain tensioner device using the chain guide according to the present invention.

As shown in FIG. 19, a timing chain 1 is endlessly wound around a crank sprocket 2 attached to a crankshaft, and a first cam sprocket 3 and a second cam sprocket 4 attached to a first cam shaft and to a second cam shaft of a valve train, respectively.

A first chain guide 5a and a second chain guide 5b are respectively arranged on the timing chain 1 between the crank sprocket 2 and the first cam sprocket 3, and on the timing chain 1 between the crank sprocket 2 and the second cam sprocket 4 so as to prevent the timing chain 1 from being slackened.

The first chain guide 5a is configured such that one longitudinal end side thereof is supported by a rotary shaft 6 so as to be rotatable with respect to an engine, and such that the other longitudinal end side thereof is rocked by a pressing device 7 so as to give tension to the timing chain 1.

The second chain guide 5b, whose opposite longitudinal ends are fixed by mounting shafts 8 with respect to the engine, guides the tensioned timing chain 1 so that the timing chain 1 is not slackened.

The first chain guide 5a and the second chain guide 5b are different from each other only in that, while the first chain guide 5a is rocked by the pressing device 7 with respect to the engine, the second chain guide 5b is not rocked and fixed with respect to the engine, and hence have the same basic structure for guiding the timing chain 1. Therefore, in the following description, the first chain guide 5a and the second chain guide 5b are collectively referred to as chain guide 5. Note that the chain guide 5 is also referred to as a chain lever.

The chain guide 5 comprises a plurality of rollers 12 which are brought into contact with the endlessly connected timing chain 1, and a guide base 9 which is provided along the running direction of the timing chain 1 and which supports opposite ends of a support shaft 13 of each of the plurality of rollers 12.

The guide base 9 comprises a pair of side plate members 9a each formed in a curved shape along the timing chain 1, and pillar members 9b connecting the side plate members 9a to each other.

A bottom member 10, which connects the mutually facing side plate members 9a to each other, is formed on the surface of the guide base 9, which surface is opposite to the chain running surface of the guide base 9.

Further, through holes 11 are respectively provided at opposite longitudinal ends of each of the side plate members 9. A shaft (not shown) is inserted into the through hole 11, so as to be fixed to, for example, an inner wall of an engine cover.

Note that, as in the first chain guide 5a in which one longitudinal end side thereof is supported by the rotary shaft so as to be rotatable with respect to the engine, and in which the other longitudinal end side thereof is rocked by the pressing device 7 to give tension to the timing chain 1, the through hole 11 of the side plate member 9a may be provided only in the one longitudinal end side.

The pressing device 7 which presses the first chain guide 5a may be a mechanical type which presses the first chain guide 5a by a spring or a screw, or a hydraulic type which hydraulically presses the first chain guide 5a.

The pair of side plate members 9a has a predetermined interval therebetween in the width direction, and the plurality of rollers 12 which are brought into contact with the timing chain 1 are arrayed between the side plate members 9. The rollers 12 may be arrayed at a uniform pitch along the side plate member 9a having a curved shape, or the pitches between the rollers 12 may be changed so that more of the rollers 12 are arranged on the entrance side in the running direction of the timing chain 1. Further, the rollers 12 supported by the guide base 9 may be arranged on a single circle, or may be arranged on the circumference of two or more circles in contact with each other.

Support recesses 14, which support opposite ends of a support shaft 13 of the roller 12, are respectively provided in the mutually facing wall surfaces of the side plate members 9a.

Figure 4:
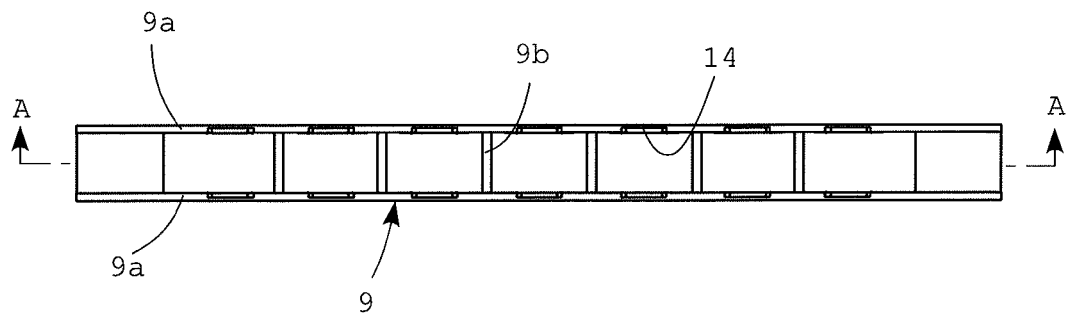
FIG. 4 is a plan view showing a state where rollers are removed from the chain guide of FIG. 1.
Figure 5:
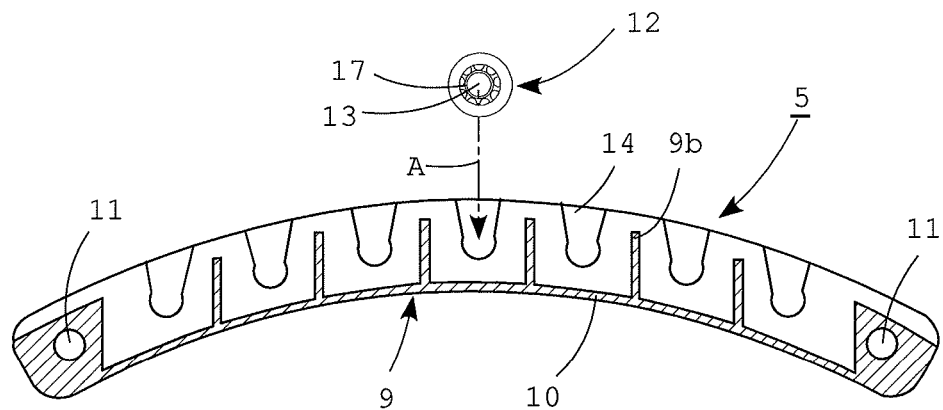
FIG. 5 is a sectional view taken along line A-A in FIG. 4.
Figure 6:
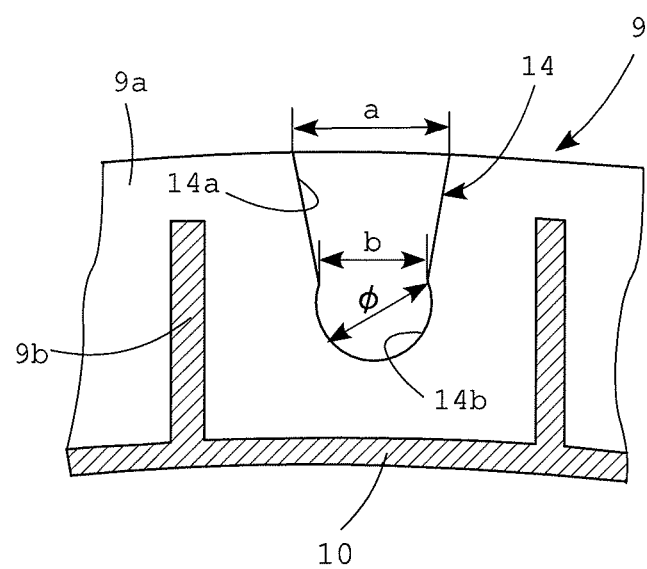
FIG. 6 is a partially enlarged view of FIG. 5.

As shown in FIG. 4, FIG. 5 and FIG. 6, each of the support recesses 14 comprises an insertion recess 14a having an opening in the side-plate-member end surface on the side of the timing chain 1, and a fixing recess 14b connected to the insertion recess 14a and having a circular arc shape into which the end portion of the support shaft 13 is fitted. Each of opposite ends of the support shaft 13 of the roller 12 is inserted from the insertion recess 14a into the fixing recess 14b, so as to be supported by each of the side plate members 9.

As shown in FIG. 5, a plurality of the support recesses 14 are arrayed along the curved shape of the side plate member 9a, and the pillar member 9b is arranged between the support recesses 14.

The pillar members 9b, each arranged between the support recesses 14, are formed so as to be aligned in parallel with the insertion direction (arrow A shown in FIG. 5) of the support shaft 13 into the support recess 14.

When the direction of the pillar member 9b and the insertion direction A of the support recess 14 are set in the same direction in this way, the drawing directions of a mold for forming the pillar members 9b and the support recesses 14 can be set in the same direction, and hence the mold can be manufactured at low cost.

As shown in the enlarged view of FIG. 6, the insertion recess 14a has a wide opening section a and is formed in a tapered shape, the width of which is gradually reduced from the opening section a to the position of the fixing recess 14b. Further, the width dimension of an insertion port b, located at the position at which the insertion recess 14a is connected to the fixing recess 14b, is smaller than the diameter φ of the fixing recess 14b having the circular arc shape.

The fixing recess 14b having the circular arc shape is formed to have the diameter φ smaller than the diameter of the support shaft 13 so that the support shaft 13 is press-fitted into the fixing recess 14b.

Figure 2:
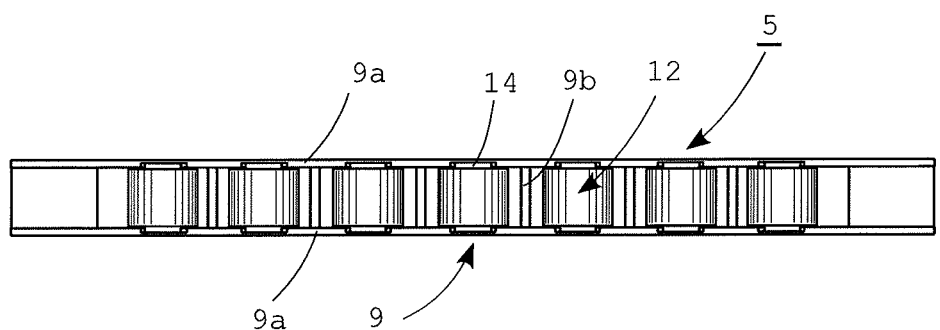
FIG. 2 is a plan view of the chain guide of FIG. 1 when the chain guide is seen from the chain side.
Figure 3:
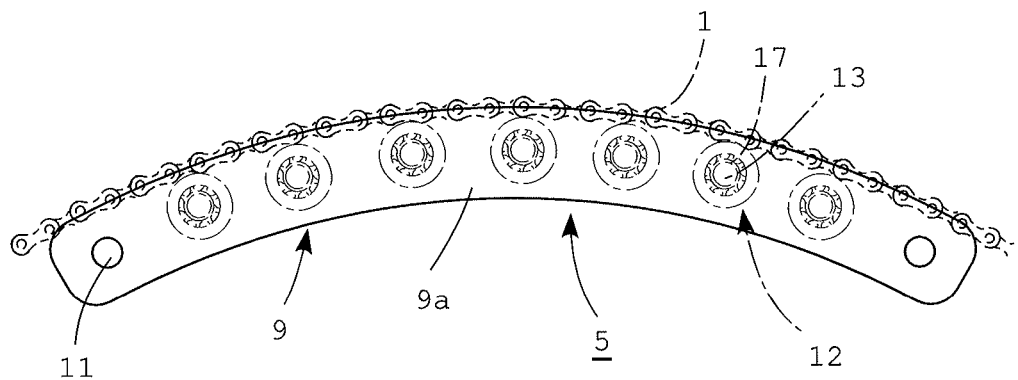
FIG. 3 is a front view of the chain guide of FIG. 1.

Further, as shown in FIG. 1 and FIG. 2, the support recess 14 is formed in the side plate member 9a in a non-penetrating state. Thereby, the shaft direction movement of the support shaft 13 inserted into the support recess 14 is regulated.

In the present embodiment, the side plate member 9a and the pillar member 9b are formed integrally by resin molding using, for example, polyamide (PA) 46 or polyamide (PA) 66 which are polymers obtained by polycondensation of diaminobutane and adipic acid. Further, it is possible to use a material obtained by combining glass fiber or carbon fiber with PA46 or PA66 in order to increase the mechanical strength. It is desirable that the hardness of the resin which forms the side plate member 9a and the pillar member 9b is 3 to 50 kJ/m² in terms of Izod impact strength. Further, when the support shaft 13 is forced into the fixing recess 14b as described below, water absorption treatment and tempering treatment may be applied to the insertion recess 14a of the side plate member 9a in order to prevent chipping at the insertion recess 14a.

When the side plate member 9a and the pillar member 9b are formed of resin, the weight of the guide base 9 can be reduced. Further, as the resin which forms the side plate member 9a and the pillar member 9b, resin having high heat conductivity can also be used for dissipating the frictional heat.

Note that the side plate member 9a and the pillar member 9b can be formed of a material other than resin, and can be formed by, for example, casting or die-casting using light metals, such as aluminum and magnesium.

Figure 7:
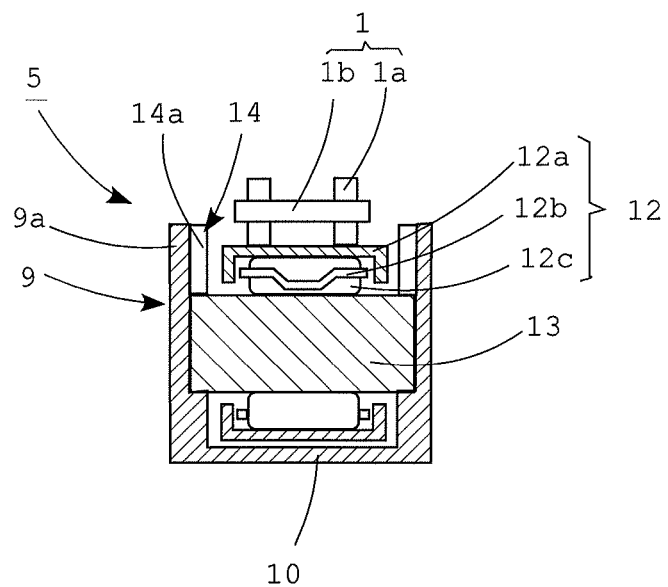
FIG. 7 is a transverse sectional view showing an embodiment of a chain guide according to the present invention.
Figure 8:
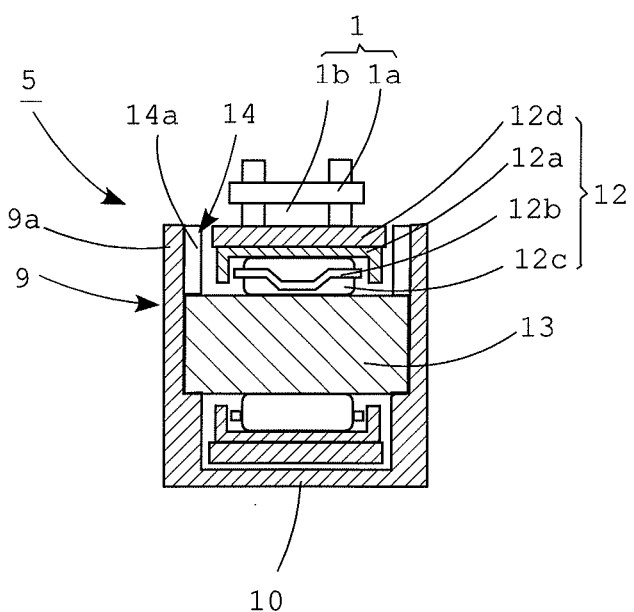
FIG. 8 is a transverse sectional view showing another embodiment of the chain guide according to the present invention.

As shown in FIG. 7, the roller 12 comprises the support shaft 13 and a roller bearing having a steel outer ring 12a which is brought into contact with the timing chain 1. Further, as shown in FIG. 8, an iron outer annulus 12d, which is brought into contact with the timing chain 1, may be provided so as to cover the outer peripheral surface of the steel outer ring 12a.

The roller bearing is a shell-type radial roller bearing comprising the steel outer ring 12a having inward-extending flange sections at opposite ends thereof, and a roller 12c provided with a retainer 12b and incorporated in the steel outer ring 12a.

The outer ring 12a, which is brought into contact with the timing chain 1, is made of steel and hence has high mechanical strength. In this way, since the outer ring 12a is made of steel, even when the timing chain 1 is made of steel, the outer ring 12a does not wear and can have sufficient mechanical strength.

Further, when the hardness of the steel outer ring 12a is higher than the hardness of the timing chain 1, the wear of the outer ring 12a can be prevented.

As a material of the outer ring 12a, a material, such as SUJ2 and SCM, which can be subjected to hardening treatment by heat treatment, is used.

In order to improve the retaining performance of lubricating oil, minute depressions and projections may be formed on the surface of the outer ring 12a.

Further, when the hardness of the outer ring 12a or the iron outer annulus 12d is set to be higher than the hardness of the timing chain 1, the wear of these members can be prevented.

As a material of the outer ring 12a or the iron outer annulus 12d, a material, such as SUJ2 and SCM, which can be subjected to hardening treatment by heat treatment, is used.

In order to improve the retaining performance of lubricating oil, minute depressions and projections may be formed on the surface of the outer ring 12a or the iron outer annulus 12d.

Further, the surface of the outer ring 12a or the iron outer annulus 12d may be subjected to nitriding treatment.

In order to avoid local high surface pressure due to point contact with the timing chain 1, it is desirable that the surface of the outer ring 12a or the iron outer annulus 12d has a generating line shape of a barrel shape or a straight shape.

The outer ring 12a can be formed by press-forming or cut-forming.

When the outer ring 12a is formed by press forming, it is preferred that, after the retainer 12b and the roller 12c are incorporated into the outer ring 12a, the inward-extending flange sections are respectively formed at opposite ends of the outer ring 12a by edge bending processing, and that the outer ring 12a is then heat treated after the assembly.

In order to reduce vibration and to achieve silence, it is desirable that the roundness of the outer ring 12a or the iron outer annulus 12d is 20 μm or less.

Further, from a viewpoint of mechanical strength, it is preferred that the thickness of the outer ring 12a or the iron outer annulus 12d is 1 mm or more.

The rollers 12c are held by the retainer 12b in the circumferential direction at predetermined intervals therebetween. As the retainer 12b, a V-shaped retainer having a V-shaped pillar section is used. When the retainer 12b is used, it is possible to prevent the skewing of the roller 12c and to prevent the end surface of the roller 12c from being brought into direct contact with the flange section of the outer ring 12a. Further, it is possible to prevent the wear of the side plate member 9a. Note that the full-type roller bearing having a roller structure without using the retainer 12b may also be adopted.

Next, in order to attach the roller 12 to the side plate members 9a facing each other, the roller 12 provided with the roller bearing on the outer peripheral surface of the support shaft 13 is first prepared as shown in FIG. 5. Further, each of opposite ends of the support shaft 13 of the roller 12 is arranged to face the insertion recess 14a of the support recess formed in each of the mutually facing wall surfaces of the side plate members 9a, and is then dropped into the insertion recess 14a, so as to be inserted into the fixing recess 14b from the insertion recess 14a. In the present embodiment, the opening section a is formed to be wide, and the insertion recess 14a is formed to have a tapered shape. Therefore, when the support shaft 13 is inserted, the support shaft 13 can be easily guided from the opening section a to the circular arc-shaped fixing recess 14b through the insertion port b.

The assembling property is improved by subjecting outer corner portions of opposite end surfaces of the support shaft 13 to R chamfering.

Further, the support shaft 13 of the embodiment shown in FIG. 5 has a cylindrical shape. However, when a D-cut or a partial cut-out is formed on the outer surface of the support shaft 13, the effect of preventing rotation of the support shaft 13 in the fixing recess 14b is improved.

Further, the depth of the insertion recess 14a and the fixing recess 14b is 1.5 mm to 2 mm.

In the above-described embodiment, the diameter φ of the circular arc-shaped fixing recess 14b is formed to be smaller than the diameter of the support shaft 13, and hence the support shaft 13 is press-fitted and attached to the fixing recess 14b. As a result, it is possible to suppress the rotation of the support shaft 13. In addition, the width of the insertion port b connected to the fixing recess 14b is formed to be smaller than the diameter φ of the circular arc-shaped fixing recess 14b, and hence the insertion port b performs a function of preventing the coming-off of the support shaft 13. Further, the support recess 14 is formed so as not to penetrate the side plate member 9a, and hence the support shaft 13 inserted into the support recess 14 can be prevented from moving in the shaft direction.

In the state where the support shafts 13 of the rollers 12 are respectively fitted into the support recesses 14 of the mutually facing side plate members 9a, the outer ring 12a of the roller bearing constituting the roller 12 is lower than the end surface of the side plate member 9a as shown in FIG. 1, FIG. 3, FIG. 4 and FIG. 7.

That is, the side plate member 9a is formed to have a height higher than the level of the outer diameter surface of the roller 12. Thereby, the timing chain 1 is guided between the mutually facing wall surfaces of the side plate members 9a, so that the running timing chain 1 is prevented from coming off from the mutually facing wall surfaces of the side plate members 9a.

Further, it is desirable that the height of the end surface of the side plate member 9a from the outer ring 12a of the roller bearing constituting the roller 12 is lower than the position of a connection pin 1b mutually connecting plates 1a constituting the timing chain 1 as shown in FIG. 7. When the height h of the end surface of the side plate member 9a from the outer ring 12a is higher than the position of the connection pin 1b mutually connecting the plates 1a constituting the timing chain 1, the connection pin 1b is brought into contact with the mutually facing wall surfaces of the side plate members 9a, and hence such configuration is not preferred.

Figure 10:
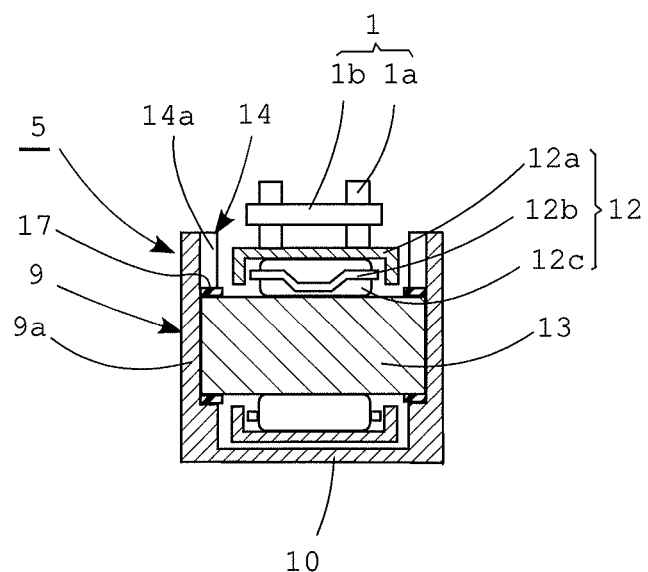
FIG. 10 is a transverse sectional view showing an embodiment of a chain guide according to the present invention.

Next, in an embodiment shown in FIG. 10, a vibration damping material 17 is accommodated between the support shaft 13 of the roller 12 and the support recess 14 of the side plate member 9a supporting each of opposite ends of the support shaft 13, so as to make it difficult for the vibration from the support shaft 13 to be transmitted to the side plate member 9a.

Figure 11:
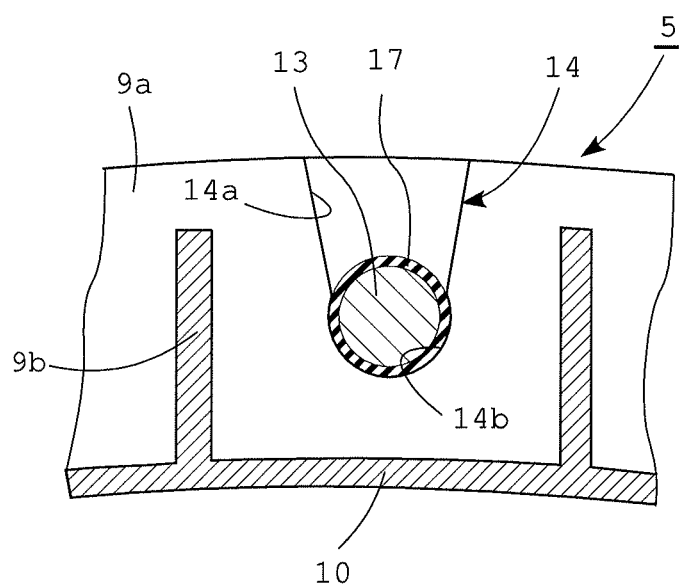
FIG. 11 is a partially enlarged view showing a state where a support shaft of the chain guide of FIG. 10 is fitted into a support recess of a side plate member.

In the embodiment shown in FIG. 10, the vibration damping material 17 is formed into a ring shape as shown in FIG. 11 and is fitted to the outer periphery of each of opposite ends of the support shaft 13.

Figure 12:
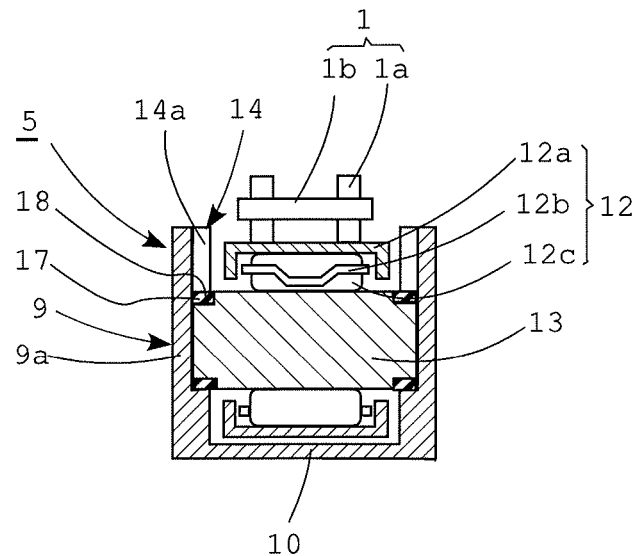
FIG. 12 is a transverse sectional view showing another embodiment of the chain guide according to the present invention.

Further, an embodiment shown in FIG. 12 uses a stepped support shaft 13 having a step 18 which is provided on the outer periphery of each of opposite ends of the support shaft 13, and to which the ring shaped vibration damping material 17 is fitted.

Figure 14:
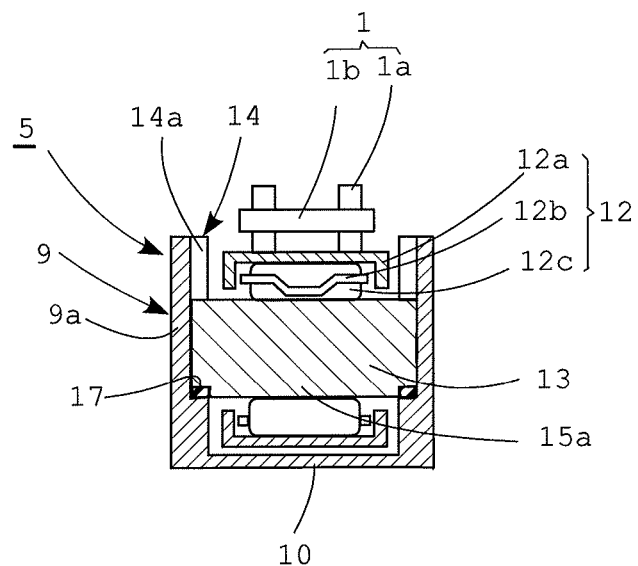
FIG. 14 is a transverse sectional view showing another embodiment of the chain guide according to the present invention.
Figure 15:
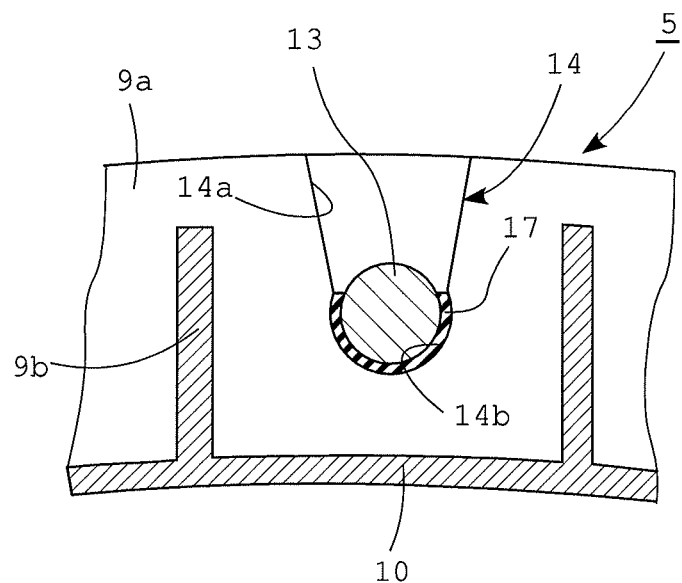
FIG. 15 is a partially enlarged view showing a state where a support shaft of the chain guide of FIG. 14 is fitted into a support recess of a side plate member.

Further, in an embodiment shown in FIG. 14, the vibration damping material 17 is not provided on the outer periphery of the support shaft 13 but is provided on the inner periphery of the support recess 14 of the side plate member 9a as shown in FIG. 15. More specifically, the vibration damping material 17 is bonded to the inner surface of the circular arc-shaped fixing recess 14b of the support recess 14.

In this way, the vibration damping material 17 does not need to be provided on the entire circumference of the outer periphery of the support shaft 13, and may be provided only in the region corresponding to the load direction.

Figure 16:
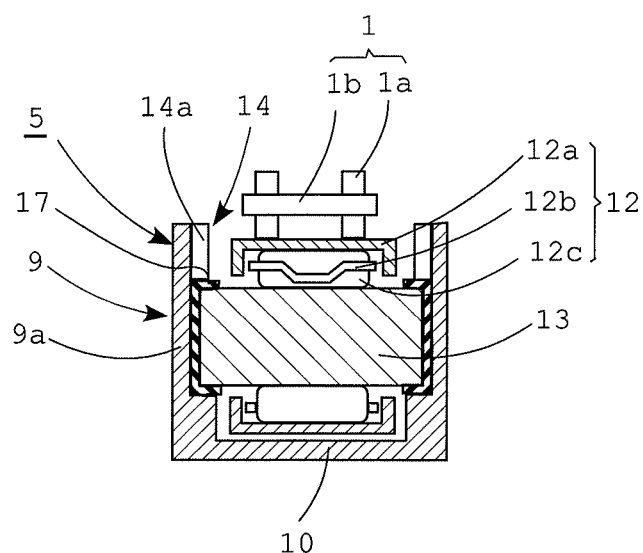
FIG. 16 is a transverse sectional view showing another embodiment of the chain guide according to the present invention.

Further, in an embodiment shown in FIG. 16, a cap-shaped vibration damping material 17 is fitted to cover the outer periphery and the end surface of each of opposite ends of the support shaft 13. In this embodiment, the end surface of the support shaft 13 is also covered with the vibration damping material 17, and hence the vibration damping effect is improved.

Figure 17:
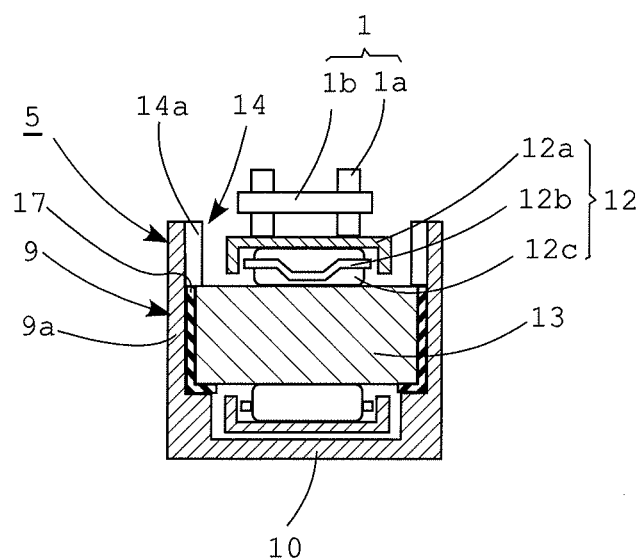
FIG. 17 is a transverse sectional view showing another embodiment of the chain guide according to the present invention.
Figure 18:
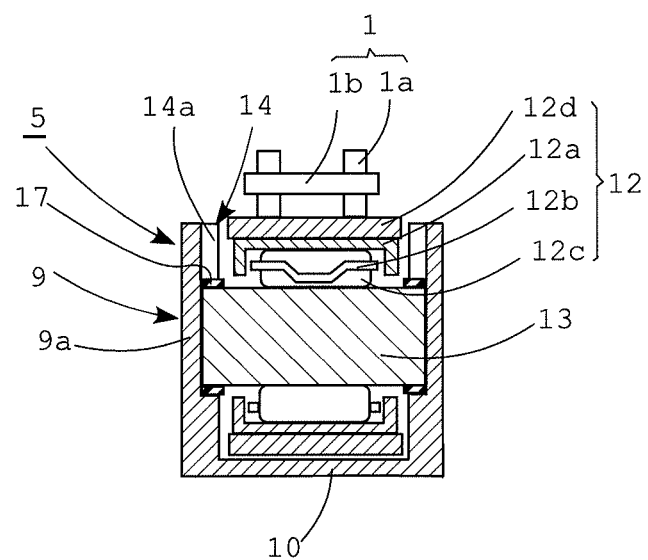
FIG. 18 is a transverse sectional view showing another embodiment of the chain guide according to the present invention.

Further, in an embodiment shown in FIG. 17, a vibration damping material 17 having an L-shaped cross-section is attached to the support recess 14. Also, in this embodiment, the end surface of the support shaft 13 is covered with the vibration damping material 17, and hence the vibration damping effect is improved.

It is preferred that the vibration damping material 17 is bonded to at least one of the outer periphery of the support shaft 13 and the support recess 14.

As a material of the vibration damping material 17, it is preferred to use hydrogenated nitrile rubber (HNBR) or fluororubber. Further, vulcanization bonding is preferred when the vibration damping material 17 is bonded to the outer periphery of the support shaft 13 or the support recess 14.

Further, it is preferred that, in the vibration damping material 17, the rigidity in the shaft direction is larger than the rigidity in the radial direction.

Figure 9:
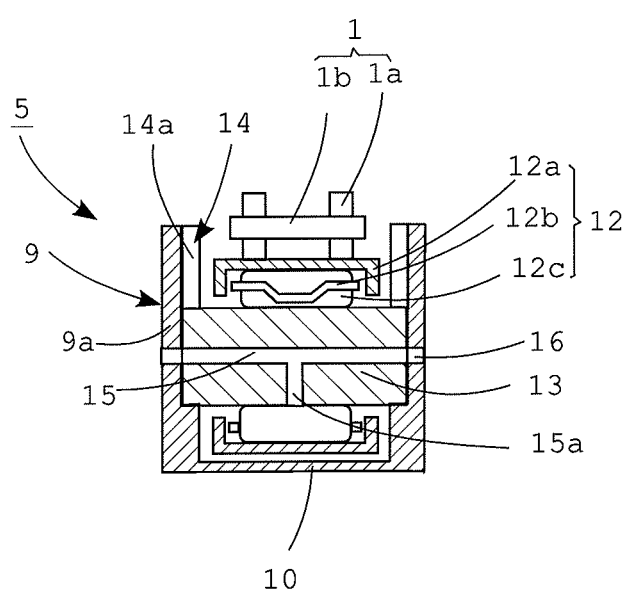
FIG. 9 is a transverse sectional view showing another embodiment of the chain guide according to the present invention.
Figure 13:
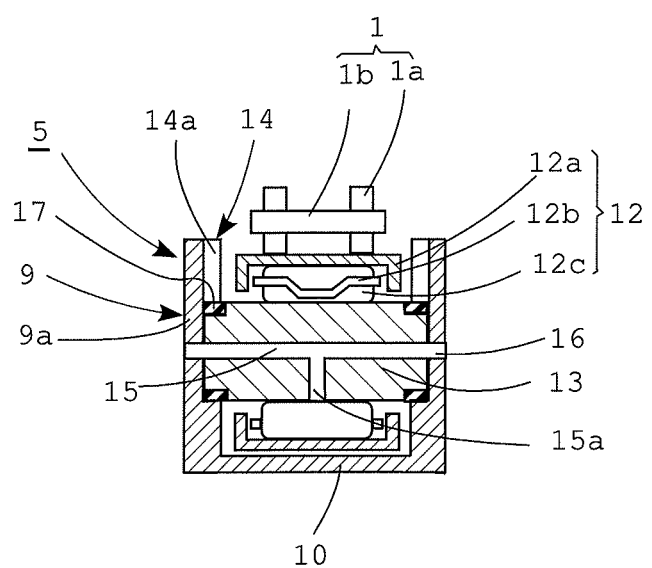
FIG. 13 is a transverse sectional view showing another embodiment of the chain guide according to the present invention.

Next, each of FIG. 9 and FIG. 13 is a transverse sectional view showing a chain guide 5 according to another embodiment of the present invention. In this embodiment, components common to those of the above-described embodiments are denoted by the same reference numerals and reference characters, and the description thereof is omitted, and only different portions are described. In this embodiment, as shown in FIG. 9 and FIG. 13, an oil hole 15 is provided at the center portion of the support shaft 13, and a discharge hole 15a for discharging oil is provided at a position opposite to the timing chain 1. Further, a hole 16 connected to the oil hole 15 is provided in the side plate member 9a. When the oil hole 15 is provided in this way, it is possible to supply oil to the inside of the bearing. Further, it is also possible to dissipate heat. It is preferred that the discharge hole 15a of the oil hole 15 is formed in the direction opposite to the timing chain 1 as described above. Thereby, oil is smoothly supplied to the inside of the bearing. Further, when the oil hole 15a is provided, the support shaft 13 is formed in a hollow shape, so that the weight of the chain guide 5 is reduced.

Further, in addition to the engine timing chain, the chain guide 5 according to each of the embodiments of the present invention can give tension to various driving chains, and can also reduce mechanical loss.

Further, as shown in FIG. 19, a chain tensioner device using the chain guide 5 according to the present invention comprises the first chain guide 5a having one end provided with the through hole 11 into which the rotary shaft 6 is inserted, and having the other end side which is pressed by the pressing device 7 so as to be rocked, and the second chain guide 5b having opposite ends which are respectively fixed by the mounting shafts 8 with respect to the engine. With the chain tensioner device, the mechanical loss of the engine timing chain is reduced and weight reduction is achieved, so that the fuel consumption rate can be improved.

When the first chain guide 5a and the second chain guide 5b are attached to an engine block, it is preferred to provide a vibration damping material between the engine block and each of the side plate members 9 of the first chain guide 5a and the second chain guide 5b.

Note that any of a roller chain and a silent chain can be used for the timing chain 1.

Further, in the above embodiments, an example is shown in which the side plate member 9a and the pillar member 9b are formed integrally with each other, but each of the side plate member 9a and the pillar member 9b may be formed as a separated body.

INDUSTRIAL APPLICABILITY

The chain guide according to the present invention is effectively used in a mechanism which gives tension to a driving chain of an engine, and the like.

REFERENCE SIGNS LIST

1 Timing chain
2 Crank sprocket
3 First cam sprocket
4 Second cam sprocket
5 Chain guide
5a First chain guide
5b Second chain guide 6 Rotary shaft
7 Pressing device
8 Mounting shaft
9 Guide base
9a Side plate member
9b Pillar member
10 Bottom member
11 Through hole
12 Roller
12a Outer ring
12b Retainer
12c Roller
12d Iron outer annulus
13 Support shaft
14 Support recess
14a Insertion recess
14b Fixing recess
15 Oil hole
15a Discharge hole
16 Hole
17 Vibration damping material
18 Step

The invention claimed is:

1. A chain guide comprising:
a plurality of rollers which are configured to be brought into contact with an endlessly connected chain, and
a guide base which supports opposite ends of a support shaft of each of the plurality of rollers, and is provided along a running direction of the chain,
wherein each of the plurality of rollers includes a roller bearing provided on an outer peripheral surface of a corresponding one of the support shafts, the roller bearing having a steel outer ring which is configured to be brought into contact with the chain,
wherein the guide base includes mutually facing side plate members respectively provided along opposite sides of the chain,
wherein a height of each of the side plate members is higher than a level of an outer diameter surface of each of the plurality of rollers so as to enable the chain to be guided between mutually facing wall surfaces of the side plate members, and
wherein the opposite ends of each support shaft are respectively supported by the mutually facing wall surfaces of the side plate members.

2. The chain guide according to claim 1, wherein the guide base includes pillar members connecting the side plate members to each other, and wherein, for each support shaft: support recesses which respectively support the opposite ends of the support shaft are respectively provided on the mutually facing wall surfaces of the side plate members, wherein each of the support recesses comprises an insertion recess having an opening in a chain-side end surface of a corresponding one of the side plate members, and a fixing recess connected to the insertion recess and having a circular arc shape into which an end portion of the support shaft is fitted, and a corresponding one of the opposite ends of the support shaft of the roller is configured to be inserted from the insertion recess into the fixing recess, so as to be supported by each of the side plate members.

3. The chain guide according to claim 2, wherein each of the pillar members connecting the side plate members to each other is aligned in parallel with an insertion direction of a corresponding one of the support shafts into a corresponding one of the support.

4. The chain guide according to claim 2, wherein a bottom member connecting the mutually facing side plate members to each other is formed on the surface of the guide base, the surface being opposite to a chain running surface of the guide base.

5. The chain guide according to claim 2, wherein the height of each of the side plate members is lower than a position of a connection pin of the chain which is configured to run while being in contact with the plurality of rollers.

6. The chain guide according to claim 2, wherein each circular arc-shaped fixing recess has a diameter that is smaller than a diameter of a corresponding one of the support shafts, and the corresponding one of the support shafts is press-fitted into the circular arc-shaped fixing recess.

7. The chain guide according to claim 2, wherein, for each of the support recesses, an insertion port is provided at a position where the insertion recess is connected to the fixing recess, the insertion port having a width that is smaller than a diameter of the circular arc-shaped fixing recess.

8. The chain guide according to claim 2, wherein the rollers supported by the guide base are arranged at non-uniform intervals along the running direction of the chain.

9. The chain guide according to claim 2, wherein the rollers supported by the guide base are arranged in a single circle, or arranged on a circumference of two or more circles in contact with each other.

10. The chain guide according to claim 2, wherein the guide base is integrally formed by using fiber reinforced polyamide (PA) 66.

11. The chain guide according to claim 2, wherein the guide base is formed of a light metal.

12. The chain guide according to claim 1, wherein the steel outer ring has inward-extending flange sections at opposite ends thereof, and each of the plurality of rollers is provided with a retainer and incorporated in the steel outer ring.

13. The chain guide according to claim 1, wherein the steel outer ring is formed by press-forming.

14. The chain guide according to claim 1, wherein a hardness of the steel outer ring or a hardness of an iron outer is annulus greater than a hardness of the chain.

15. The chain guide according to claim 1, wherein the steel outer ring or an iron outer annulus has a generating line shape of a barrel shape or a straight shape.

16. The chain guide according to claim 1, wherein the steel outer ring or an iron outer annulus has a thickness of 1 mm or more.

17. The chain guide according to claim 1, wherein a roundness of the steel outer ring or an iron outer annulus is 20 μm or less.

18. A chain tensioner device wherein the chain guide according to claim 1 is arranged at a middle portion of an endlessly connected chain.

19. A chain tensioner device wherein: at least two of the chain guides according to claim 1 are respectively arranged at middle portions of an endlessly connected chain, a first end side of a first one of the at least two of the chain guides is supported by a rotary shaft and a second end side of the first one of the at least two of the chain guides is pressed by a pressing device so as to be rocked to give tension to the chain, and opposite ends of second one of the at least two of the chain guides are fixed so that the second one of the at least two of the chain guides is pressed against the chain.

20. The chain guide according to claim 1, wherein a bottom side of the chain that faces the plurality of rollers is higher than an uppermost portion of each of the plurality of rollers.

21. The chain guide according to claim 1, wherein an outer diameter of each of the plurality of rollers is constant.

* * * * *